US011635368B2

(12) United States Patent
Kamler

(10) Patent No.: US 11,635,368 B2
(45) Date of Patent: Apr. 25, 2023

(54) HIGH PRESSURE FLOW CELL FOR SPECTRAL ANALYSES AND SPECTRAL RANGE CONVERSION

(71) Applicant: UNIVERSITY OF ALASKA FAIRBANKS, Fairbanks, AK (US)

(72) Inventor: Jonathan Kamler, Juneau, AK (US)

(73) Assignee: UNIVERSITY OF ALASKA FAIRBANKS, Fairbanks, AK (US)

( * ) Notice: Subject to any disclaimer, the term of this patent is extended or adjusted under 35 U.S.C. 154(b) by 311 days.

(21) Appl. No.: 16/800,809

(22) Filed: Feb. 25, 2020

(65) Prior Publication Data

US 2020/0271566 A1 Aug. 27, 2020

Related U.S. Application Data

(60) Provisional application No. 62/809,930, filed on Feb. 25, 2019.

(51) Int. Cl.
| | | |
|---|---|---|
| *G01N 21/05* | (2006.01) | |
| *G01N 15/14* | (2006.01) | |
| *H01J 49/04* | (2006.01) | |
| *G01J 3/44* | (2006.01) | |
| *G01N 21/03* | (2006.01) | |

(52) U.S. Cl.
CPC ........... *G01N 21/05* (2013.01); *G01J 3/44* (2013.01); *G01N 15/1436* (2013.01); *G01N 15/1459* (2013.01); *G01N 21/0303* (2013.01); *H01J 49/0404* (2013.01); *G01N 21/0317* (2013.01); *G01N 2021/052* (2013.01)

(58) Field of Classification Search
CPC ........... G01N 15/1436; G01N 15/1459; G01N 21/0303; G01N 21/05; G01N 2021/052; G01N 21/0317; G01J 3/44; H01J 49/0404
See application file for complete search history.

(56) References Cited

U.S. PATENT DOCUMENTS 5,057,216 A * 10/1991 Chervet ................. G01N 21/05
96/101
5,957,858 A * 9/1999 Micheels ........... G01N 21/3504
600/529

(Continued)

*Primary Examiner* — Michael P LaPage
(74) *Attorney, Agent, or Firm* — Ballard Spahr LLP

(57) ABSTRACT

A flow cell can comprise a high-pressure, fluidic, flow-through housing that encloses and auto-aligns a heavy-walled, internally reflective low-cost glass capillary for concentrating and amplifying laser-excited spectra. The containment housing that encloses the capillaries can optionally sustain operational pressures of at least 10,000 psi. The pressure housing can be fitted with transparent optical windows that can accommodate laser-safe injection and spectra collection. The flow-cell design can adaptably accommodate different optical sampling configurations such as transmissive (forward scattering), reflective (backward scattering), or multipass, combined scattering. The flow cell size is scalable (lengthwise) to accommodate different applications or installations such as benchtop (lab), permanent (industrial), and portable (field). With new, miniaturized spectrometers, the flow cell can optionally be configured for transport as a real-time, high-sensitivity gas-analysis sensor aboard compact aerial or otherwise mobile systems (e.g., drones) for remote or hazardous applications.

14 Claims, 12 Drawing Sheets

(56) References Cited

U.S. PATENT DOCUMENTS

| | | | | |
|---|---|---|---|---|
| 6,065,630 | A * | 5/2000 | Outwater | G01N 21/0317 |
| | | | | 220/582 |
| 6,332,049 | B1 * | 12/2001 | Dasgupta | G01J 3/4406 |
| | | | | 385/12 |
| 9,658,153 | B2 * | 5/2017 | Goto | G01N 30/74 |
| 10,830,692 | B2 * | 11/2020 | Wang | G01N 33/18 |
| 2002/0102183 | A1 * | 8/2002 | Uchimura | G01N 21/05 |
| | | | | 422/400 |
| 2007/0132230 | A1 * | 6/2007 | Mueller | B01L 3/502715 |
| | | | | 285/124.5 |
| 2007/0285656 | A1 * | 12/2007 | Mark | G01N 21/0317 |
| | | | | 356/300 |
| 2009/0230028 | A1 * | 9/2009 | Mueller | G02B 6/032 |
| | | | | 385/12 |
| 2010/0277722 | A1 * | 11/2010 | Kraiczek | B81C 1/00071 |
| | | | | 204/461 |
| 2018/0156715 | A1 * | 6/2018 | Francis | G01N 21/05 |

* cited by examiner

HIGH PRESSURE FLOW CELL FOR SPECTRAL ANALYSES AND SPECTRAL RANGE CONVERSION

CROSS-REFERENCE TO RELATED APPLICATION

This application claims priority to and the benefit of U.S. Provisional Patent Application No. 62/809,930, filed Feb. 25, 2019, the entirety of which is hereby incorporated by reference herein.

FIELD

This invention relates to spectroscopy equipment and, more particularly, to spectroscopy equipment for measuring flowing fluids.

BACKGROUND

Optical flow cells enable spectroscopy equipment to easily and quickly detect and analyze chemical compositions and concentration of fluids (gases or liquids) under operational flow conditions. Spectroscopic flow cells allow real-time, non-destructive, and non-extractive fluidic composition sampling as fluids of interest pass through the sampling rig. Spectroscopy is a commonly used chemistry diagnostic tool for chemical compound identification and concentration measurement in solids and liquids. Indeed, most chemicals, minerals, and gases generate unique spectral "fingerprints" with higher concentrations having linear relationships to signal strength, thereby making their presence and concentrations easily and quickly identifiable and measurable via spectroscopy. Gas analyses via some spectroscopy methods have traditionally presented diagnostic challenges due to weak signals and apparatus complexity. Notably, Raman spectroscopy, for example, is routinely used to quickly analyze solids and liquids. Gases, however, are problematic and seldom analyzed via Raman methods due to the fact that Raman signals for solids and liquids are already inherently quite weak and dramatically more so for diffuse gases. The few devices capable of performing such analytical sampling are typically plagued by a litany of problems including inflexibly specialized engineering, proprietary parts, complicated manufacturing, poor scalability, fragility vulnerabilities, zero portability, maintenance challenges, high cost, and mediocre sensitivity due to the inherently weak signals.

Conventional spectroscopy flow cells use, exclusively, flexible, thin-walled glass capillaries. Such thin wall capillaries require special systems to maintain the capillary in an optically straight configuration. For example, some such systems include a housing having a long (e.g., about 1 meter) machined bore with a diameter of about one millimeter to receive and support the outer surface of the capillary. Such a housing can be difficult and prohibitively expensive to produce. Other systems apply significant tension to the capillary in order to keep it straight. For example, a common method includes cooling an assembly in liquid nitrogen and coupling the capillary to the apparatus while the assembly is cool so that when the assembly warms to room temperature, its expansion pulls the capillary straight. Again, such a system can be difficult and prohibitively expensive to produce. Moreover, conventional systems are too heavy for certain applications.

SUMMARY

Disclosed herein, in one aspect, is a flow cell for spectral analysis. The flow cell can have a longitudinal dimension and can comprise an elongate housing defining an interior. A capillary waveguide can extend along the longitudinal dimension through the interior of elongate housing. The capillary waveguide can have an outer surface defining an outer diameter, an inner bore defining an inner diameter, opposing first and second ends, and a length. The capillary waveguide can define an inlet and an outlet to the inner bore. The capillary waveguide can have sufficient rigidity to remain optically straight when supported only by vertical forces at opposing ends. A first window can be positioned at the first end of the capillary waveguide. A second window at the second end of the capillary waveguide.

The inner diameter of the capillary wave guide can be between approximately 0.1 and approximately 1 mm. The outer diameter of the capillary waveguide can be at least 0.125 inches with even larger outer diameters preferable.

Each of the first and second windows each comprise single crystal sapphire.

The flow cell can further comprise a reflective coating on the inner bore of the capillary waveguide.

The reflective coating can comprise at least one material selected from the group consisting of: silver, gold, aluminum, and a dielectric material.

The flow cell can be configured to withstand an internal pressure of at least 10,000 psi.

The flow cell can further comprise an alignment fitting having a first end and an opposing second end and defining an interior bore proximate to the first end that is configured to receive an O-ring seal. The interior bore at the first end can define a taper having a decreasing inner diameter in a direction away from the first end. The alignment fitting can be coupled to the elongate housing via a first compression seal at the second end of the alignment fitting.

The flow cell can further comprise a compression fitting that receives the second end of the alignment fitting. The compression fitting can be coupled to the alignment fitting via a second compression seal. The first window can be received within the compression fitting. A nut can threadedly engage the compression fitting. Threaded engagement of the nut with the compression fitting can cause a biasing force against the first window. A first O-ring can be compressed between the compression fitting and the first window. A compression sleeve can be at least partially received within the interior bore of the alignment fitting so that the first window biases against the compression sleeve. A second O-ring can be received within the interior bore of the alignment fitting and compressed between the compression sleeve and the alignment fitting.

The flow cell can further comprise a plurality of elongate rods extending along the longitudinal dimension of the flow cell. A plurality of plates defining holes therethrough can receive respective elongate rods of the plurality of elongate rods. Each of the plurality of plates can receive therethrough and support a portion of the flow cell.

A spectroscopy system can comprising a flow cell, a laser that is configured to provide a beam into the first end of the capillary waveguide, and a spectrometer that is configured to receive at least a portion of the beam from the second end of the capillary waveguide.

A method can comprise providing a flow of gas through a spectroscopy system. A beam can be provided from the light source through the inner bore of the capillary waveguide. At least a portion of the beam can be received from the laser at the spectrometer.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
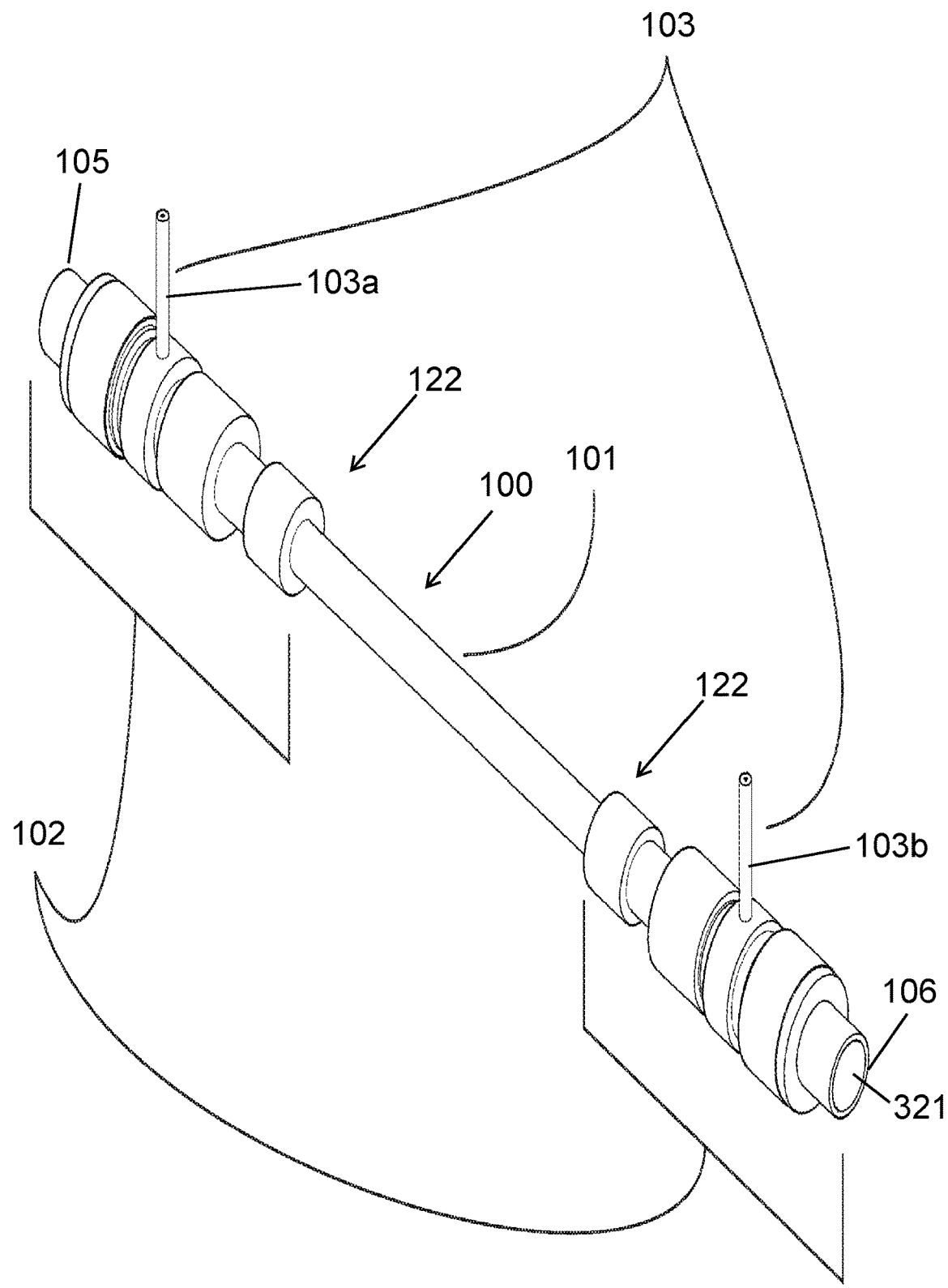
FIG. 1 is a perspective view of the flow-cell in a basic assembled configuration.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a", "an", and "the" include plural references unless the context clearly dictates otherwise. Thus, for example, reference to "a compression fitting" includes a plurality of such compression fittings, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," "approximately," or "generally," it is contemplated that values within up to 15%, up to 10%, or up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Figure 2:
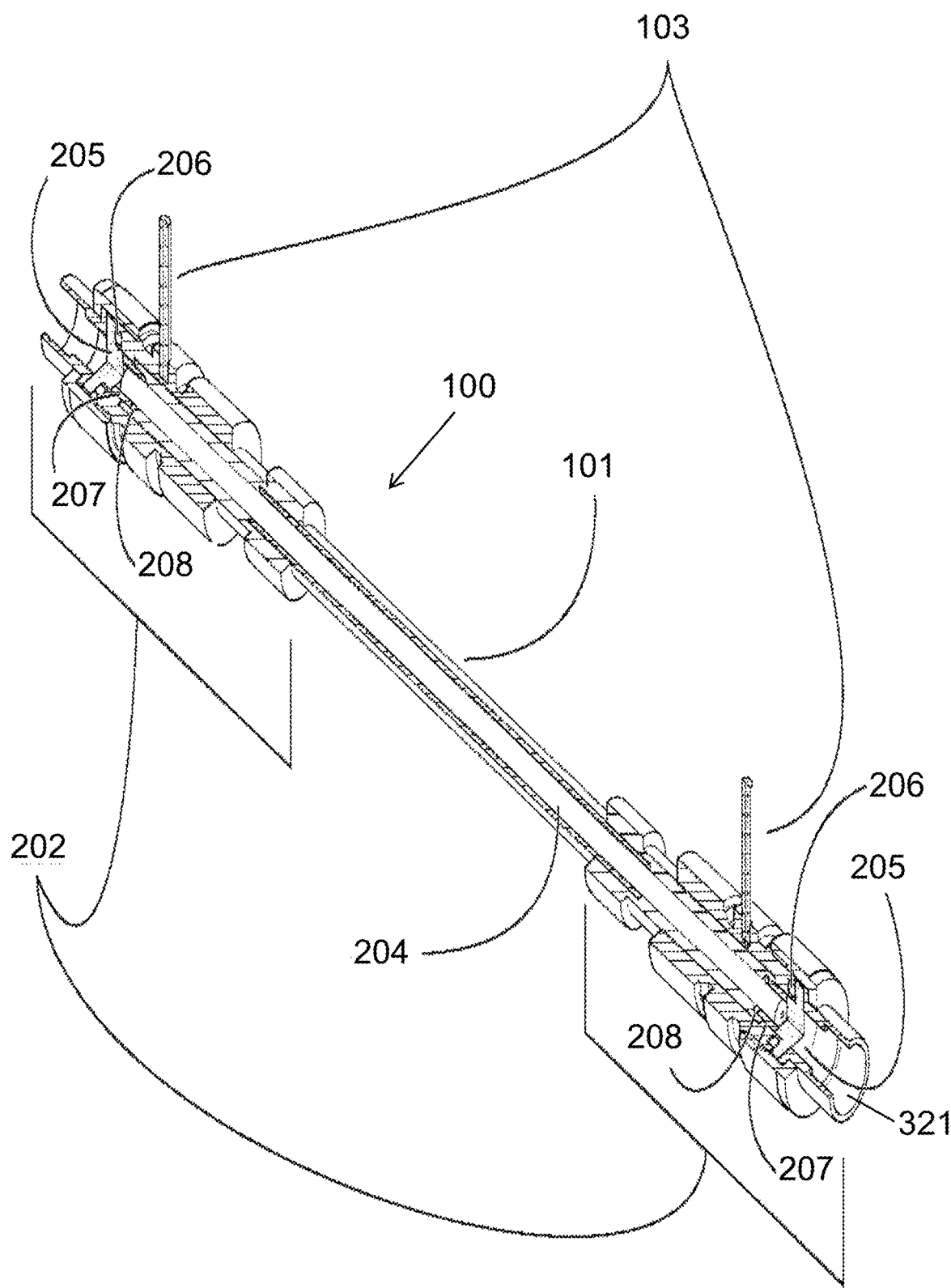
FIG. 2 is a partial cutaway perspective view of the flow-cell in FIG. 1.
Figure 3:
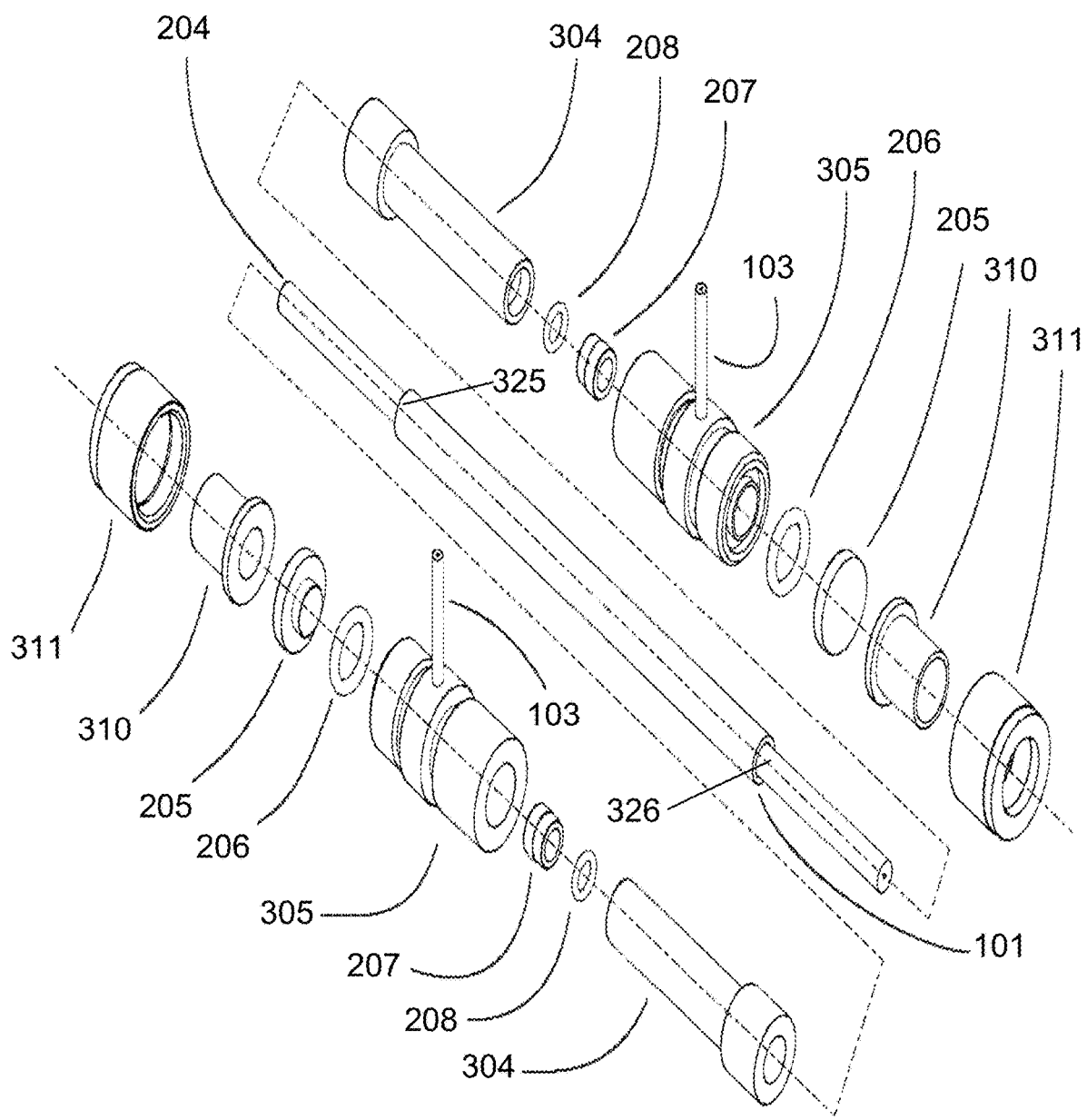
FIG. 3 is an exploded perspective view of the flow-cell in FIG. 1.

Disclosed herein in various aspects, with reference to FIGS. 1-3, is a flow cell 100 having a first end 105 and a second end 106. The flow cell 100 can comprise an enclosure tube 101 having opposed ends 122. The enclosure tube 101 can comprise metal or other suitable material. The enclosure tube 101 can be sealed at both ends 122 by compression fitting assemblies 102 that couple to the opposed ends. Fluidic inflow and outflow ports 103 can provide fluid communication to the interior of the fluid housing to enable flow-through operation. For example, sample fluids (gas, liquid, or plasma) can flow into one port 103 *a* and out of the other port 103 *b*. Numerous internal parts enclosed by and incorporated into the pressure housing can collectively comprise the flow cell embodiment that is illustrated and explained below. In some optional aspects, the flow cell 100 can be symmetric about a plane that is perpendicular to the longitudinal dimension of the flow cell.

Figure 5:
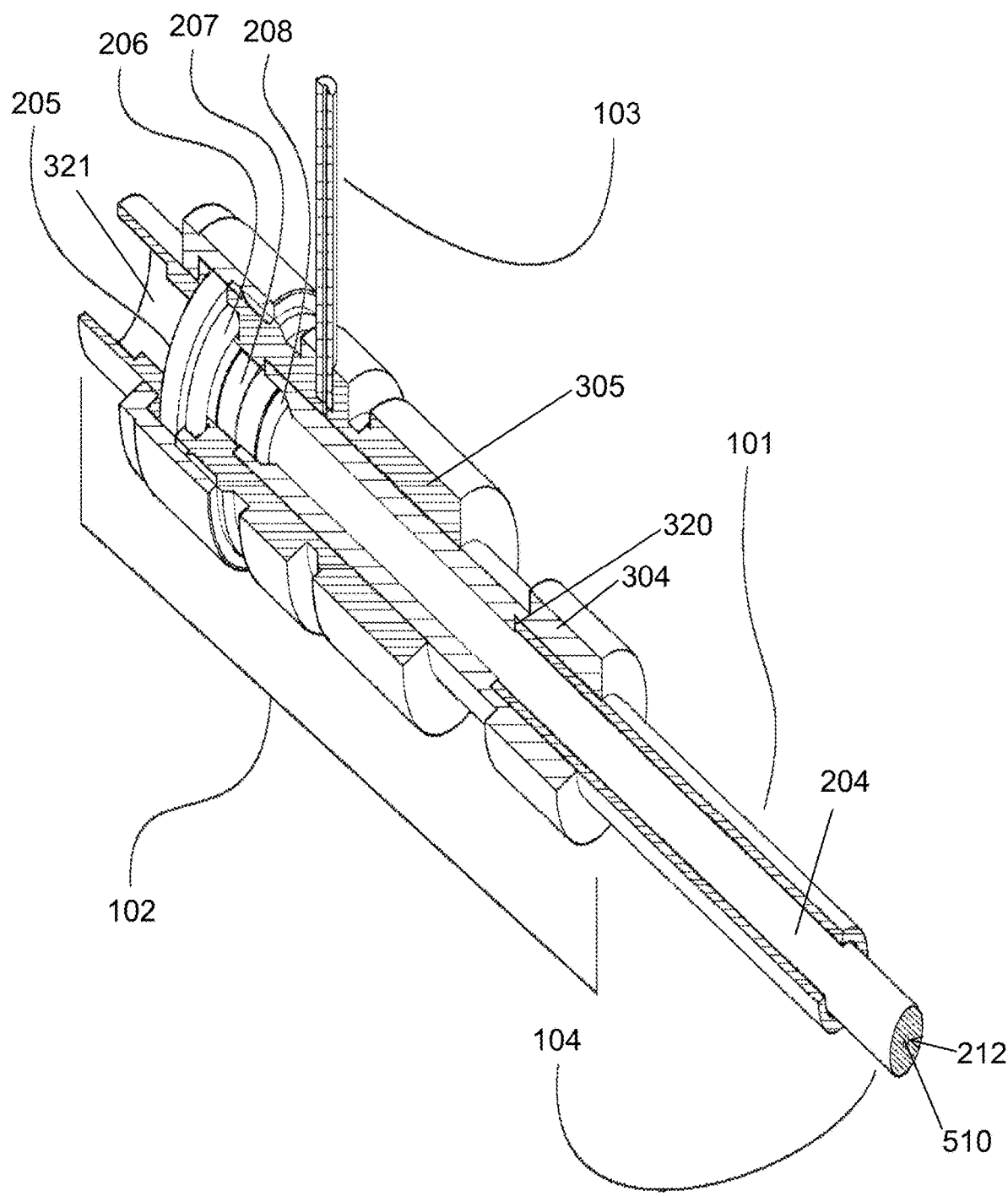
FIG. 5 is a partial cutaway view of the exemplary flow-cell end shown in FIG. 4 that offers examination of the internal relationship of the exemplary parts.

The exemplary embodiment of the apparatus as shown in FIG. 1 is further shown in partial cutaway overview in FIG. 2. The enclosure tube 101, compression fitting assembly 102, and fluidic ports 103 have been partially cutaway to reveal an exemplary orientation of a capillary waveguide 204, transparent optical windows 205, window O-ring seals 206, capillary-seal compression sleeves 207, and capillary O-ring seals 208. The capillary waveguide 204 can have an outer surface and an inner bore 212 (FIG. 5).

Optionally, the transparent optical windows 205 can comprise single crystal sapphire. The capillary waveguide 204 can optionally comprise borosilicate glass. Glass can be an optimal material for receiving a silver coat via capillary silvering.

The exemplary embodiment of the apparatus as shown in FIG. 1 is further shown in partially exploded overview in FIG. 3, wherein the relative linear orientation of the individual parts is illustrated. The capillary waveguide 204 can extend through the enclosure tube 101 and beyond each of a first longitudinal end 325 (FIG. 3) and a second longitudinal end 326 (FIG. 3) of the enclosure tube 101. Compression alignment fittings 304 can connect directly to the enclosure tube 101. For example, referring also to FIG. 5, the compression alignment fittings 304 can define respective inner diameters that can receive a portion of the enclosure tube 101 and respective shoulders 320 that can abut respective ends of the enclosure tube 101. The compression alignment fittings 304 can coupled to the enclosure tube 101 with respective compression seals (e.g., comprising tapered ferules compressed within threadedly mating portions of the compression alignment fittings to grip the enclosure tube at a location within the mating portions, as is known for coupling components such as those provided by Swagelok). Additionally, the compression alignment fittings 304 can provide auto-alignment for the capillary waveguides 204. The fluidic ports 103 are shown as part of the adaptive and integrated combination compression to face-sealed fittings 305.

According to some optional aspects, face-seal compression flanges 310 can deliver axial force to the optical windows as face-seal compression nuts 311 are threadedly tightened. For example, the face-seal compression nuts 311 can threadedly engage corresponding threads on the exterior of the face-sealed fittings 305. An internal void space 321 of face-seal compression flanges 310 (also known as "glands") can also provide suitable inline positioning for placement of appropriately sized standard optical filters (not shown). Another embodiment (not shown) is contemplated wherein the assembly comprises the capillary O-ring seals 208 and capillary-seal compression sleeves 207 being held in place by a lip inside the fittings 305 and are then compressed when the compression alignment fittings 304 are tightened into the fittings 305.

At each end, the enclosure tube 101 and the capillary waveguide 204 can be received within the compression alignment fitting 304. The fitting 305 can receive the end of the compression alignment fitting 304 opposite the enclosure tube 101. The O-ring 208 can be positioned within the fitting 305 and against the end of the capillary waveguide, followed, in turn, by the capillary-seal compression sleeve 207, the O-ring 206, the optical window 205, and the face-seal compression flange 310. The face-seal compression nut 311 can threadedly couple to the fitting 305, thereby compressing therebetween the O-ring 208, the capillary-seal compression sleeve 207, the O-ring 206, the optical window 205, and the face-seal compression flange 310.

Accordingly, as each face-seal compression nut 311 is tightened down against the respective fittings 305, an inner face of the compression nut can bias against the face-seal compression flange 310, which can, in turn bias against the window 205, which can, in turn, bias against the window O-ring seal 206 to compress the O-ring seal 206 within an O-ring groove in the fitting 305. Radially inward of the O-ring seal 206, the window 205 can bias against the capillary-seal compression sleeve 207 that can bias against the capillary O-ring seal 208, thereby compressing the capillary O-ring seal 208 against the compression alignment fitting 304. Thus, the capillary O-ring seals 208 and capillary-seal compression sleeves 207 in this embodiment can be directly compressed by the optical windows 208. Accordingly, the optical windows 208 can optionally serve as force-delivery anvils.

Assembly order is flexible in this embodiment in that the capillary O-ring seals 208 and capillary-seal compression sleeves 207 can be inserted into the compression alignment fittings 304 prior to inserting the compression alignment fittings 304 into the fittings 305 or can be inserted into the compression alignment fittings 304 through the opposite ends of the fittings 305 after they have been joined to the compression alignment fittings 304. The optical windows 205 can axially move the capillary-seal compression sleeves 207 to the degree that the window O-ring seals 206, which can be housed within a groove in the fittings 305, allow such travel.

When the capillary O-ring seals 208 are compressed into the compression alignment fittings 304 by the capillary-seal compression sleeves 207, the capillary O-ring seals 208 can auto-align the capillary waveguide 204 to the radial center of the compression alignment fittings 304. The capillary O-ring seals 208 can further seal the fluidic flow path. Accordingly, the capillary O-ring seals 208 can also delimit the fluid flow path between fluidic ports 103 as being only through the capillary waveguide 204.

Figure 4:
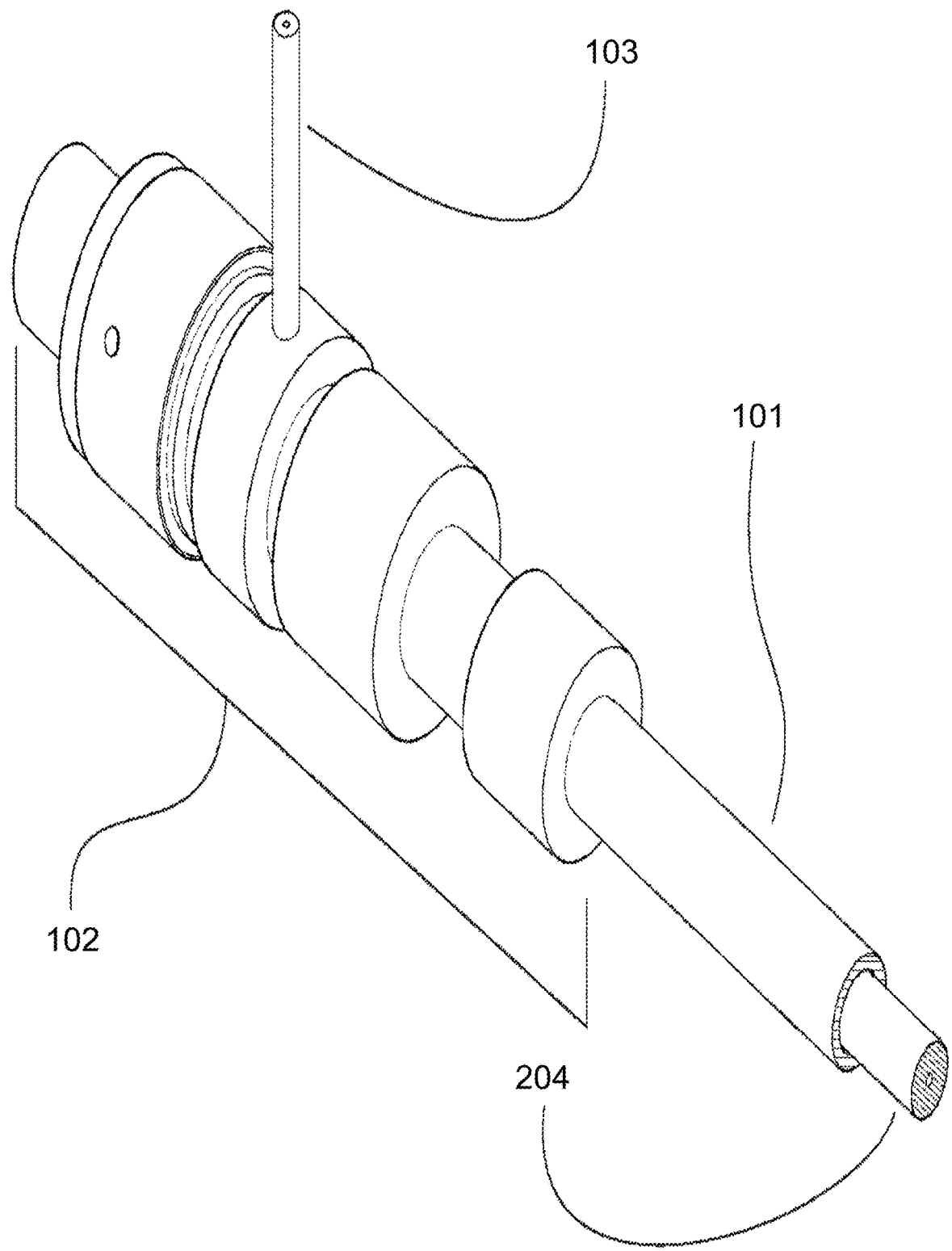
FIG. 4 is a close-up partial perspective view of one end of the exemplary flow cell in FIG. 1 that offers a more detailed view of a possible exemplary compression fitting configuration.

The exemplary embodiment of the apparatus as shown in FIG. 1 is further shown in greater detail via a close-up view on one end in FIG. 4, wherein part of the enclosure tube 101 is length-truncated cut away as it protrudes axially from the collection of compression fitting assembly 102 and only as single fluidic flow port 103 is shown. The capillary waveguide 204 is also partially cut away as it protrudes axially from the enclosure tube 101.

The exemplary embodiment of the apparatus as shown in FIG. 4 is further shown in partial cutaway overview in FIG. 5, wherein additional internal details of components' relative arrangements are shown. Specifically, the manner in which the enclosure tube 101 fits into the compression fitting assembly 102. The flow path for the single fluidic flow port 103 is shown, and the orientation of the capillary waveguide 204 as it passes through enclosure tube 101 and the compression fitting assembly 102 is also shown. The axial orientation of the transparent optical window 205 relative to the window O-ring seal 206 and subsequently to the capillary-seal compression sleeves 207, and capillary O-ring seals 208 visually demonstrate the collective internal mechanics of the apparatus assembly and sealing mechanisms.

Figure 6:
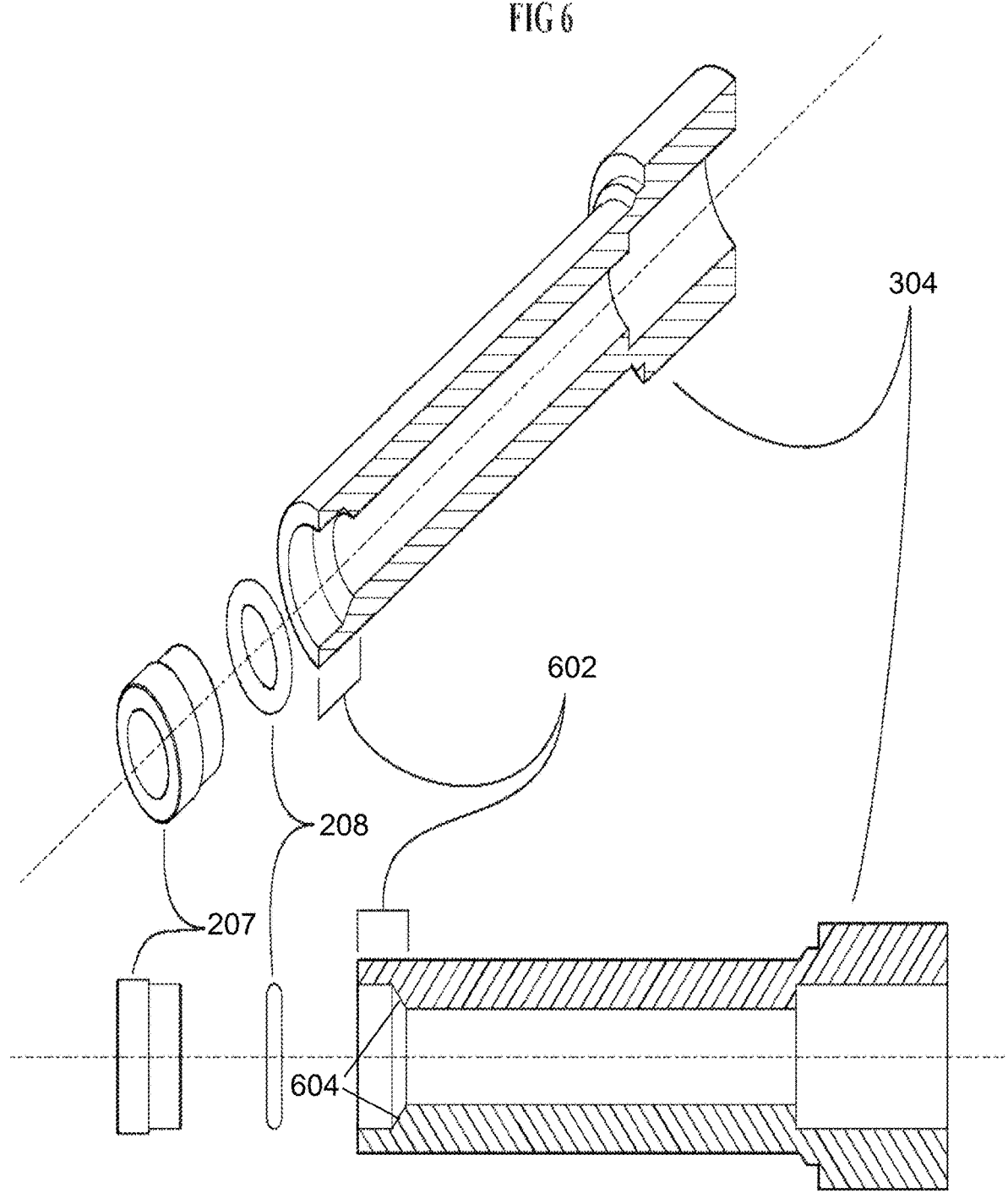
FIG. 6 is a cutaway view in perspective (top) and profile (bottom) of an exemplary fitting in FIG. 3 that auto-aligns the capillary waveguide and shows with the exemplary machined modification that guides and maintains the auto-alignment.

Multiple cutaway views of a compression alignment fitting 304 used in this apparatus are shown in FIG. 6 with an oblique perspective view (top) as well as a side-on profile view (bottom) shown for the same fitting. A portion can be formed (e.g., via machining) into the interior end of a compression alignment fitting 304 in order to produce a compression-seal pocket 602 into which the capillary O-ring seal 208 can seal and auto-align the capillary waveguide 204 (FIG. 2) when the capillary O-ring seal 208 is compressed into place by the capillary-seal compression sleeve 207. The compression-seal pocket can define a cylindrical bore that has an outer diameter sufficient to receive an outer diameter of the capillary O-ring seal 208. The compression-seal pocket 602 can further define a taper 604 having a decreasing diameter in a direction away from the compression sleeve 207. The compressed capillary O-ring seal 208 can guide and maintain both auto-alignment (radially centering) for the capillary as well as form a gas-tight seal that prevents fluids from leaking into the area between the capillary waveguide and the compression alignment fitting 304.

According to optional aspects, the compression alignment fitting 304 can be a SWAGELOK long reducer SS-600-RF-8; the combination compression to face-sealed fittings 305 can be a SWAGELOK VCO tube fitting connector SS-8-VCO-6-810; the window O-ring seals 206 can be a SWAGELOK vacuum fitting O-ring VT-7-OR-010; the compression sleeve 207 can be a SWAGELOK ¼ inch vacuum fitting sleeve; the capillary O-ring seal 208 can be a SWAGELOK VCO face seal O-ring 111; the face-seal compression flanges 310 can be SWAGELOK VCO tube socket weld nut glands SS-8-VCO-3; and the face-seal compression nuts 311 can each be a SWAGELOK VCO face seal nut SS-8-VCO-4. Although exemplary fittings, sleeves, O-rings, seals, flanges, and nuts are disclosed herein, it is contemplated that other components can be used to serve the same or equivalent purposes.

Referring to FIGS. 1 and 5, many of the components can connect to define small gaps therebetween through which fluid can flow. Thus, fluid from the inlet 103 can flow through a path defined by unsealed gaps between components. For example, the fluid from the inlet can flow through the annular space between the compression alignment fitting 304 and the fitting 305. A compression seal (not shown) between the compression alignment fittings 304 and the fitting 305 can inhibit fluid flowing between the compression alignment fittings 304 and the fitting 305 toward the opposing side (the right, as illustrated). Thus, the flow is forced through the gap between the compression fitting 304 and the fitting 305 toward the respective end of the flow cell 100. The fluid can then flow through the annulus between the fitting 305 and the compression sleeve 207 away from the O-ring 208. Then, the fluid can flow between the sapphire window 205 and the compression sleeve 207. Thus, the flow path can be: through the inlet 103a; between the compression alignment fitting 304 and the fitting 305 toward the first end 105 to the end of the compression alignment fitting 304; between the compression sleeve 207 and the fitting 305 to the end of the compression sleeve 207 proximate to the first end 105; radially inward between the compression sleeve 207 and the window 205, radially inward between the window 207 and the capillary 204, and into the inner bore 212 of the capillary. The fluid can then flow through the inner bore of the capillary and exit the outlet 103b at the second end 106 through a flow path between corresponding components in the reverse order.

Figure 7:
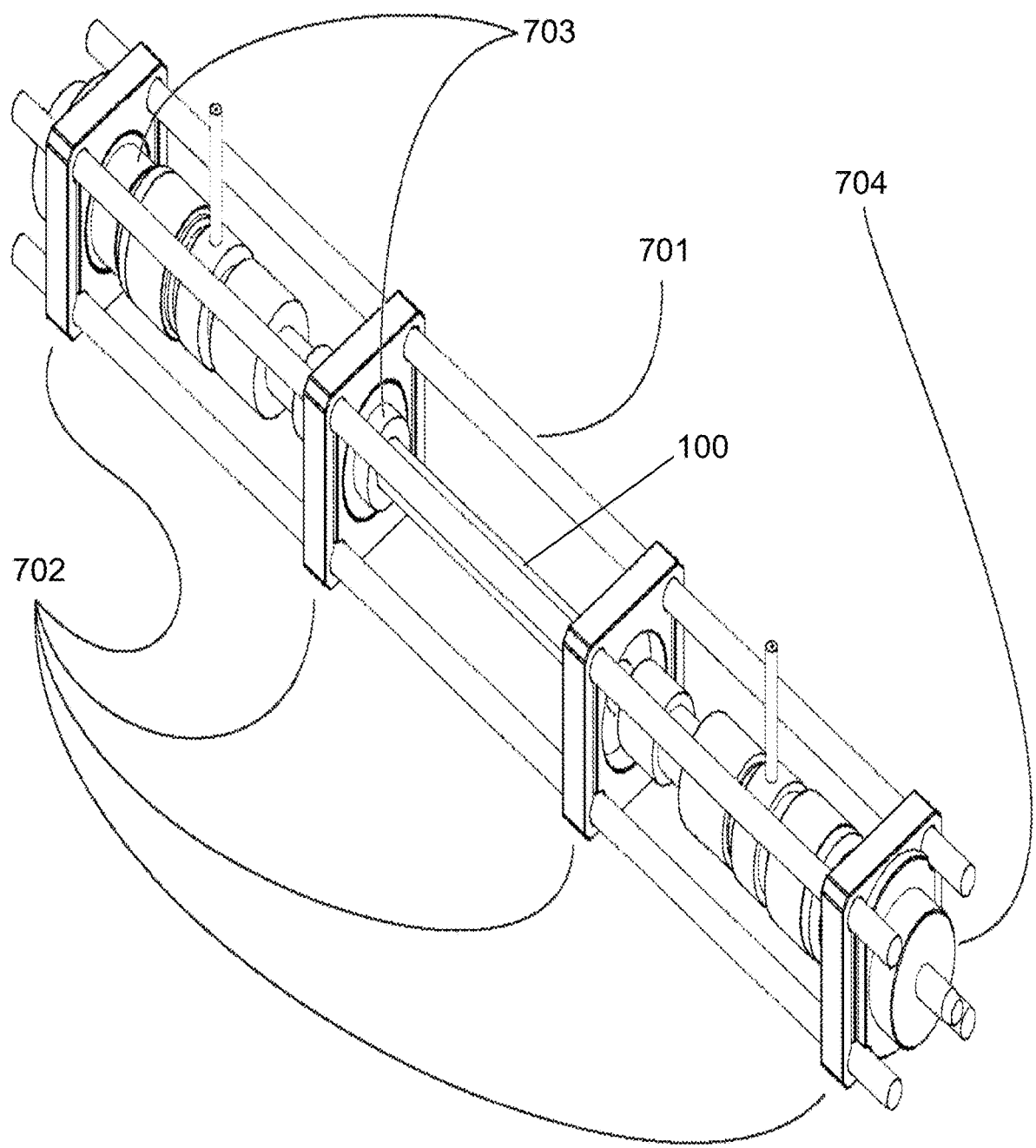
FIG. 7 is perspective view of an exemplary flow cell in FIG. 1 having been integrated into an exemplary optical "cage" assembly commonly used in laboratory optical experiments.

The exemplary embodiment of the apparatus as shown in FIG. 1 is further shown in having been integrated into an optical system in FIG. 7, wherein exemplary optical cage components provide precise optics alignment. Specifically, the cage system can comprise cage rods 701 that are aligned and joined to the exemplary flow cell assembly 100 by exemplary cage plates 702. The cage plates 702 can be configured to receivable engage the body of the flow cell by compatible cage-plate adapters 703. For example, cage plate adapters 703 can define through-bores that can receive respective portions of the flow cell assembly. Optical laser light delivery and spectra collection can be performed by directly cage-compatible adjustable optics 704. The cage-compatible adjustable optics 704 can optionally be off-the-shelf collimators, such as, for example, ThorLabs FiberPort collimators. Similar integration options (not shown) can be accomplished in a straightforward manner using optics rails or optics tubes or any similar combination.

Exemplary embodiments disclosed herein provide advantageously simple, yet precise assembly of a fluidic flow cell enabling spectral analyses of fluids during experimental or operational flow conditions. Simple construction using the disclosed components reduces production man-hours for fabrication, maintenance, and repair when compared to specially fabricated alternatives by orders of magnitude, thereby creating a significant economic savings. Furthermore, components offer pre-known engineer certification for critical industrial applications. Collectively, flow-cell features resulting from the design and construction can significantly lower costs.

Exemplary embodiments disclosed herein can comprise a high-pressure containment housing that encloses and automatically aligns a heavy-walled, internally reflective glass capillary waveguide for concentrating and amplifying light stimulated spectra from fluids (gases or liquids) for spectroscopic analyses. According to some optional aspects, a capillary waveguide can be enclosed in a protective metal tubing that can constitute the body of the pressure housing. The capillary waveguide can be suitably sealed using a variety of compression fittings. According to some optional aspects, the high-pressure containment housing, including all associated fittings that encloses the capillary waveguide can sustain operational pressures of 6,000 psi or higher with at least a 4:1 safety margin (burst pressures above 24,000 psi). The pressure housing can be fitted with high-pressure input and output windows using suitable materials matched to the specific needs.

Suitable optical window materials can be used to meet specific performance requirements. A single crystal sapphire window, for example, can provide several advantages over silicate glass, including: 1) resilient, laser-safe injection and spectra collection ports, 2) very high pressure containment (>100 k psi) well in excess of the rest of the housing, and 3) excellent scratch resistance durability, second in hardness only to diamond. Also, unlike silicate glass, sapphire windows can advantageously produce very distinctly and narrowly punctuated spectra that does not broadly overlap with the weak gas signals and is therefore easily distinguished from most gas spectra.

The internal capillary wall can be coated with a highly reflective material 510 (FIG. 5) such as silver, gold, aluminum, dielectric layer, or other suitably reflective coating in order to directionally delimit light traveling internally down the length of the capillary and prevent light from leaking into and/or through the capillary walls.

Internally reflective glass-capillary waveguides can serve as flow-through sample cavities. Capillary waveguides can greatly improve effectiveness by: 1) reflectively "cavity enhancing" laser-to-fluid interaction, 2) reflectively "surface enhancing" the laser-to-fluid interaction due to inherently close proximity of the fluid to the reflective, capillary wall, and 3) confining, concentrating, and collimating photons along the length of a narrow, linear path for high-efficiency collection and delivery to the spectrometer optics.

The apparatus can comprise a heavy-walled glass capillary that can be internally reflective for high reflectivity and therefore function as optical waveguides. Due to their heavy-walled construction, such heavy-walled capillary waveguides can by extension be innately rigid, durable and optically straight, thereby offering high operational reliability, alignment stability, and integration simplicity by accommodating compression fittings. The heavy-walled, glass capillaries can offer redundant reliability having their own burst-pressure ratings well in excess of that for the metal, high-pressure, containment housing.

The waveguide capillary 204 can have a rigidity sufficient to remain optically straight when supported only with vertical forces on each end. As used herein, the term "optically straight" can be understood to mean that, assuming 100% internal reflectivity, a majority of a laser beam emitted into the first end exits the second end. Thus, unlike conventional flexible waveguides, the capillary waveguide 204 does not require use of a specialized housing or assembly in order to remain straight. It is contemplated that the flow cell 100 can optionally support the capillary waveguide along its length, but it need not do so. Rather, it can optionally support the capillary waveguide only on the ends of the waveguide. Moreover, the flow cell can support the capillary waveguide only with vertical forces, thus avoiding any need to maintain the capillary waveguide in tension.

In using a heavy-walled capillary, the capillary can be easier to handle than a thin-walled, flexible capillary. Further, the heavy-walled capillary can be more durable and less subject to breaking.

Optionally, the heavy-walled capillary can have an inside diameter between approximately 0.1 mm and approximately 1 mm (e.g., optimally, approximately ⅓ mm) and an outside diameter that is at least 0.125 inch, with even larger outer diameters preferable. For example, it is contemplated that the outside diameter can be as large as 0.15 inches, 0.175 inches, 0.2 inches, 0.25 inches, or 0.3 inches in some aspects. It is contemplated that outside diameters smaller than 0.125 inches can lose the benefits of rigidity when sparsely supported over longer spans. It is further contemplated that inside diameters smaller than 0.1 mm can create fluid flow impedance issues. It is still further contemplated that inside diameters larger than 1 mm can reduce the efficacy of the internal reflectiveness. The heavy-walled capillary can optionally have a length of a half a meter or a meter.

The flow-cell design can nimbly accommodate different optical configurations, thereby enabling differing sampling techniques such as IR/UV absorption or fluorescence (among others) via transmissive or reflective capture. Raman effects can also be captured via forward scattering, backward scattering, multipass combined scattering, or single-pass combined scattering. Resulting spectra from the respective sampling techniques can be conveyed to suitable spectroscopes via free-space or fiber-based optics.

The flow-cell size can be scalable lengthwise to accommodate different applications or installations such as benchtop (lab), permanent (industrial), and portable (field). The flow cell can optionally be configured using miniaturized spectrometers for transport as a real-time, high-sensitivity gas-analysis sensor package for portable, hand-held operation or aboard compact autonomous, aerial, underwater, surface water, or ground-based mobile systems (e.g., drones) for remote or hazardous applications.

Flow-cell capillaries can be easily removed from the pressure housings for replacement, cleaning, maintenance, or refurbishment and can be easily replaced and automatically aligned. One end of the flow cell can be fitted with a transparent, pressure-safe window made from any suitable material such as glass or sapphire through which laser radiation is introduced from a free-space laser or an optical fiber. The absorption, fluorescence, or emissions spectra (e.g., forward-scattered, Raman-shifted) signals can be collected through another window at the opposite end of the flow cell via optical fiber or free-space optics and conveyed to the spectrometer. It is further contemplated that modified optical configurations can be configured for reflected spectra emissions (e.g., back-scattered or multipass Raman).

Embodiments of the flow-cell apparatus can enable detection of gas concentrations that can be very difficult to reliably measure with gas chromatography (e.g., hydrogen—$H_2$) especially if the presence of the gas is short-lived and/or episodic. High-speed, reliable measurements of difficult-to-measure fuel-gas concentrations is distinctly advantageous over a gas chromatographer and has major implications for technologies where fluctuating, episodic, undesirable, or dangerous gas-composition changes are possible such as coal gasification, fuel-cell operations, steam-turbine gas bearings, or nuclear power plants. Quick response can save time, money, equipment, and lives, and a new, flow-cell-based gas sensor based on high-speed laser gas spectroscopy such as that described here provides a suitable option.

The flow-cell apparatus can enable precise and reliable measurement of episodic gas composition changes with full integration over very small time intervals (<100 milliseconds). Compositional gas-stream analyses can therefore be continuously captured in near real time with no off-line specialized sample prep, while simultaneously distinguishing between mixtures of multiple gases including, but not limited to $H_2$, $CH_4$, CO, $CO_2$, $N_2$, $O_2$, and many other gas species. Notably, the flow cell is designed to be a turn-key, bolt-on solution to existing spectroscopic systems.

Various embodiments of the flow-cell apparatus can comprise a fluidic optical flow cell and accompanying optics alignment apparatus with compression fittings; internally reflective, heavy-walled capillary waveguide; integrated seals and special capillary waveguide auto-aligning seal pockets; and transparent optical windows.

According to some embodiments, the flow cell can function as a flow-through sampling tool whereby the spectra of fluid chemical compounds (gaseous or liquid) can be collected in order to identify and measure chemical-compound concentrations via standard optical spectroscopic methods.

According to some embodiments, the flow cell can function as a spectral-conversion device wherein the apparatus is filled with a single high-purity fluid (gas or liquid) or specific fluid mixture and light from a laser or other source is passed through the fluid, thereby producing as predictable spectral shift. The apparatus can achieve the said spectral shift via the well-established Raman effect or other suitable processes.

According to some embodiments, the flow cell can achieve a rating of operational pressures of at least 10,000 psi and operational temperatures of at least 250° C., depending upon the material of construction.

According to some embodiments, the flow cell can include a simple low-volume linear capillary waveguide core which serves as a low-volume cavity that in turn improves gas contact with excitation light source (e.g., a laser) and consequently provides a combination of surface & cavity signal enhancement along with a linear-cavity collimated containment and amplification of the signal.

According to some embodiments, the flow cell can produce multipass signal enhancement by bouncing some of the excitation laser light radially back and forth across the capillary waveguide internal reflective surface capillary as the light travels along its length.

According to some embodiments, the flow cell can produce multipass signal enhancement by bouncing some of the excitation laser light axially back and forth along the capillary waveguide length using one or more mirrors and associated optics.

According to some embodiments, the flow cell can prevent perpendicular or radial signal loss via axial collimation by the linear capillary waveguide.

According to some embodiments, the flow cell can allow spectral signal collection at either axial end of the apparatus as reflective (back-scattered) radiation, transmissive (forward-scattered) radiation, or a combination of the two.

Figure 8:
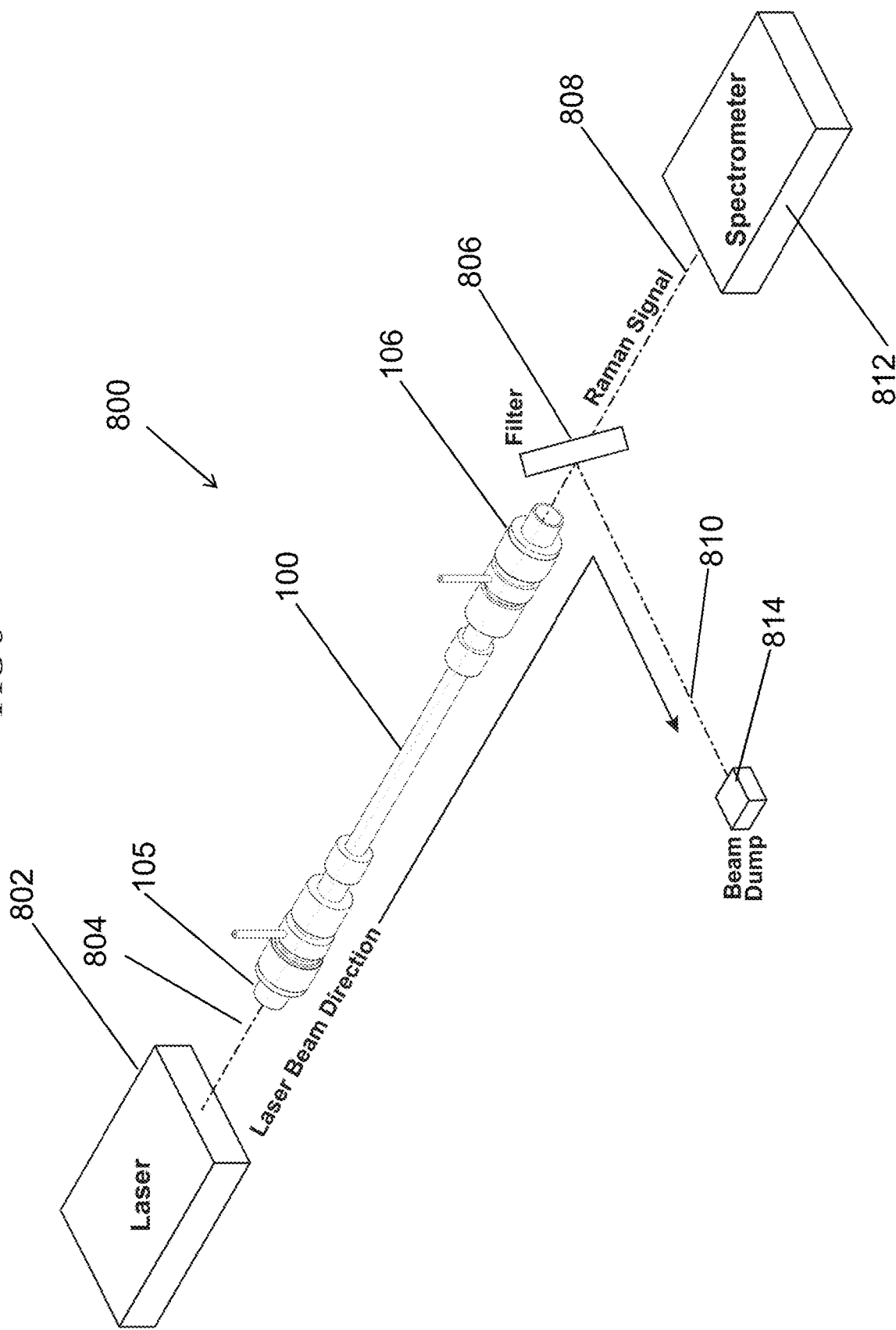
FIG. 8 is a schematic of the flow cell with laser beam passing through it wherein forward scattered signal is gathered and conveyed to an associated spectrometer.

For example, referring to FIG. 8, in a forward-scattered Raman system 800, a light source 802 (e.g., a laser) can emit a laser beam 804 into the flow cell 100 through the first longitudinal end 105 of the flow cell. The laser beam 804 leaving the second longitudinal end 106 of the flow cell can pass through a filter 806. A first portion 808 of the laser beam 804 comprising the Raman signal can enter into a spectrometer 812. The filter 806 can direct a remaining second portion 810 of the laser beam 804 to a beam dump 814.

Figure 9:
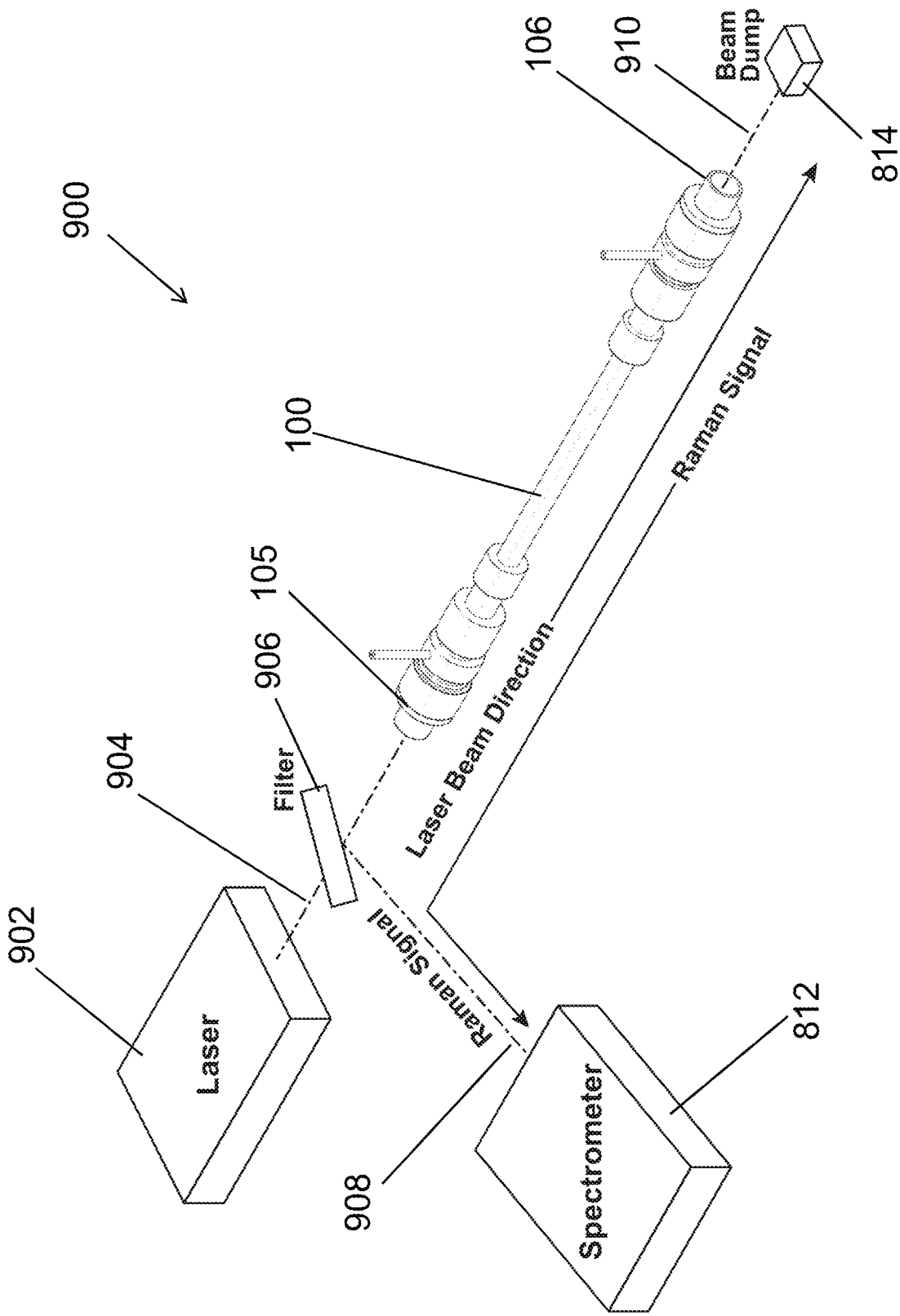
FIG. 9 is a schematic of the flow cell with laser beam passing through it wherein backward scattered signal is gathered and conveyed to an associated spectrometer.

Referring to FIG. 9, in a back-scattered Raman system 900, a laser beam 904 from a light source 902 can pass through a filter 906 and then enter the flow cell 100 at the first longitudinal end 105. A first portion 908 of the laser beam 904 can be back scattered and exit the first longitudinal end 105. The back-scattered portion of the laser beam can reflect against the filter 906 and then enter the spectrometer 812. A remaining second portion 910 of the laser beam 904 can pass through the flow cell 100, exit the second longitudinal end 106, and pass into a beam dump 814.

Figure 10:
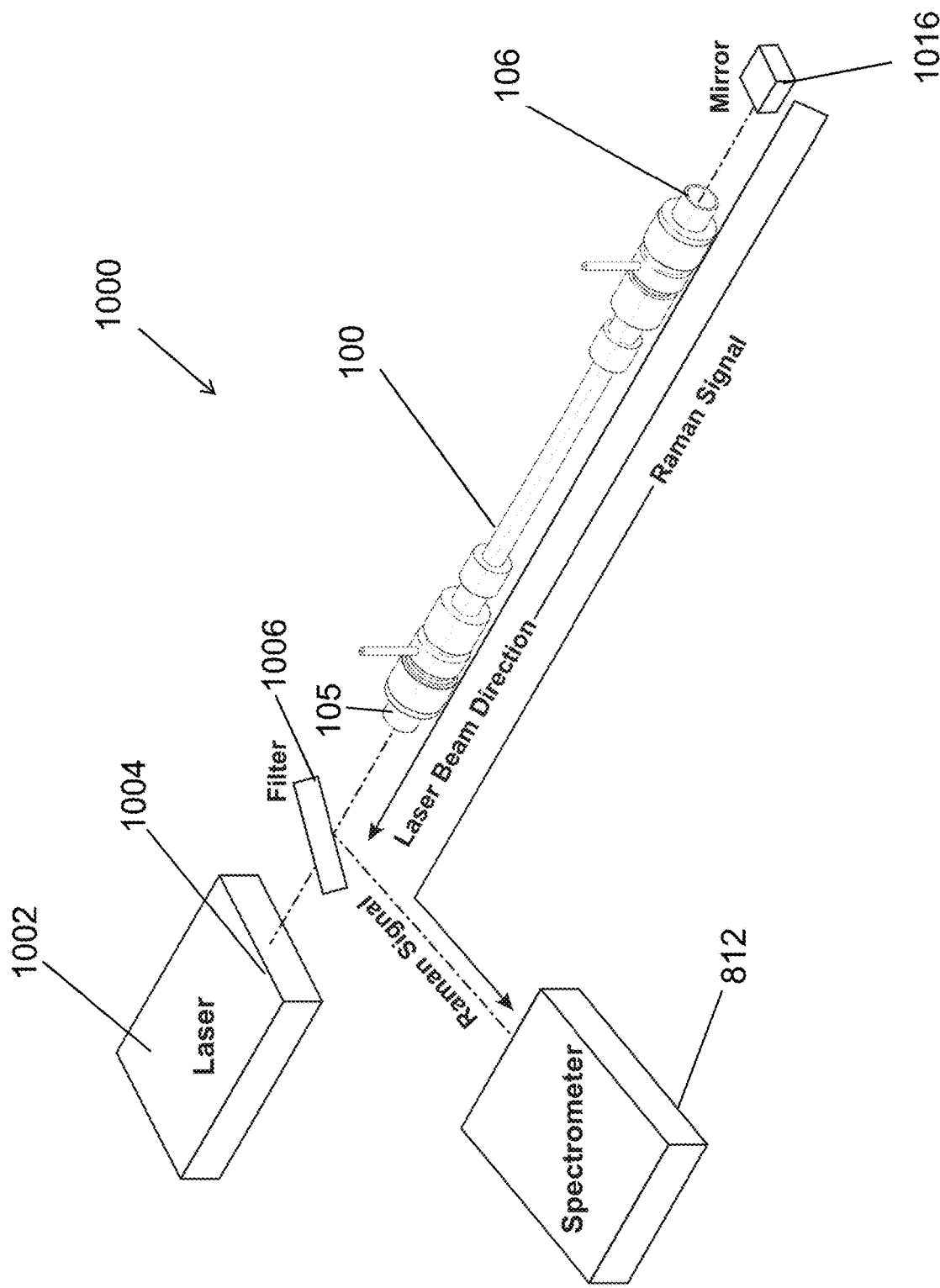
FIG. 10 is a schematic of the flow cell with laser beam passing through it wherein the laser beam is multi-passed through the flow cell (via a mirror) and forward scattered signal is gathered (via a mirror) along with backward scattered signal and both are conveyed to an associated spectrometer.

Referring to FIG. 10, in a multipass backward and forward scattered Raman system 1000, a laser beam 1004 from a light source 1002 can pass through a filter 1006 and then enter the flow cell 100 at the first longitudinal end 105. A mirror 1016 can reflect the portion of the beam 1004 that leaves the second longitudinal end 106 back into the flow cell. The beam exiting the first end 105 of the flow cell 100 can reflect against the filter 1006 and enter the spectrometer 812.

Figure 11:
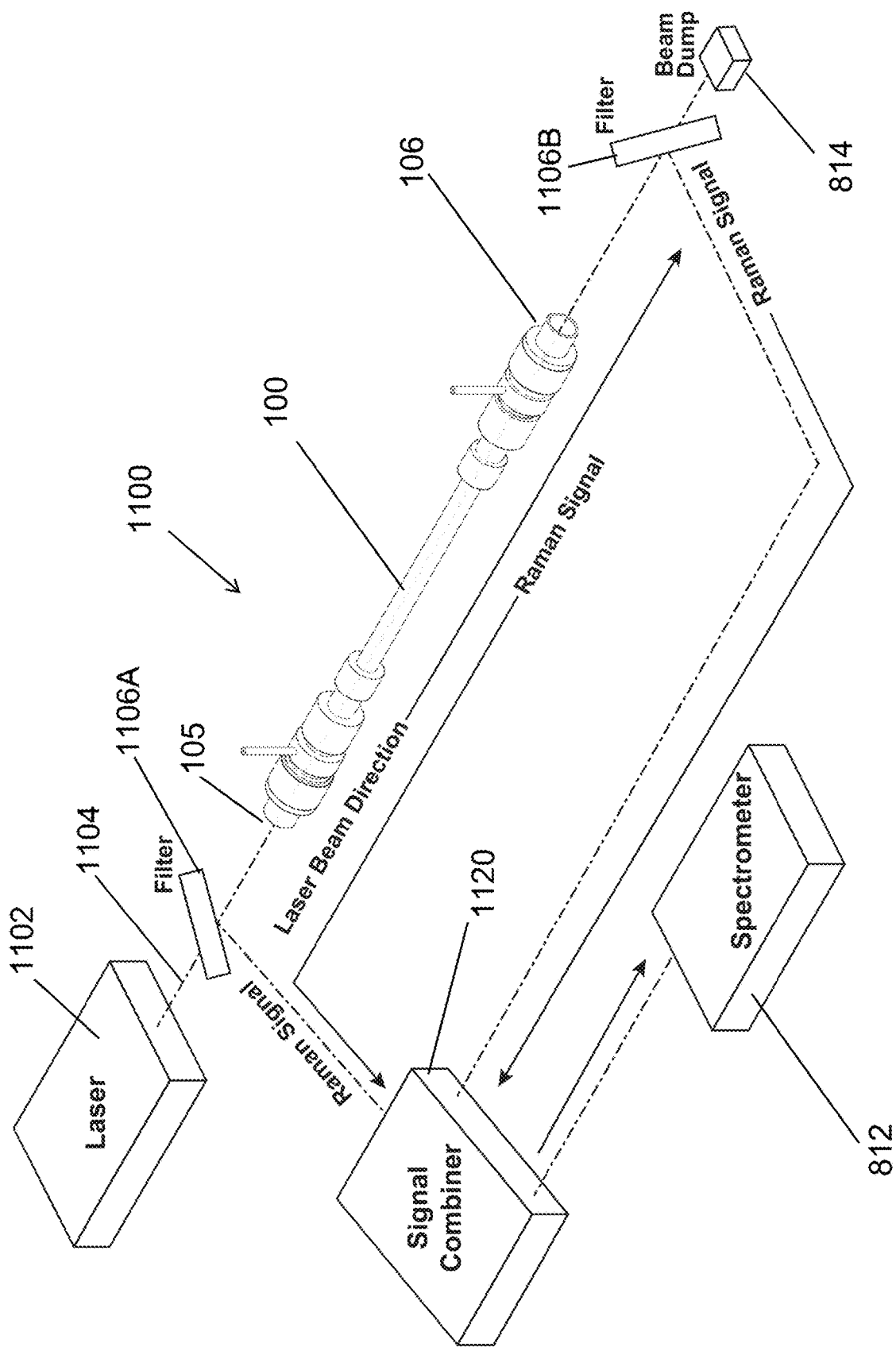
FIG. 11 is a schematic of the flow cell with laser beam passing through it wherein the forward scattered signal is gathered and backward scattered signal is separately gather, then both signals are joined via as signal combiner device and then the combined signal is conveyed to an associated spectrometer.
Figure 12:
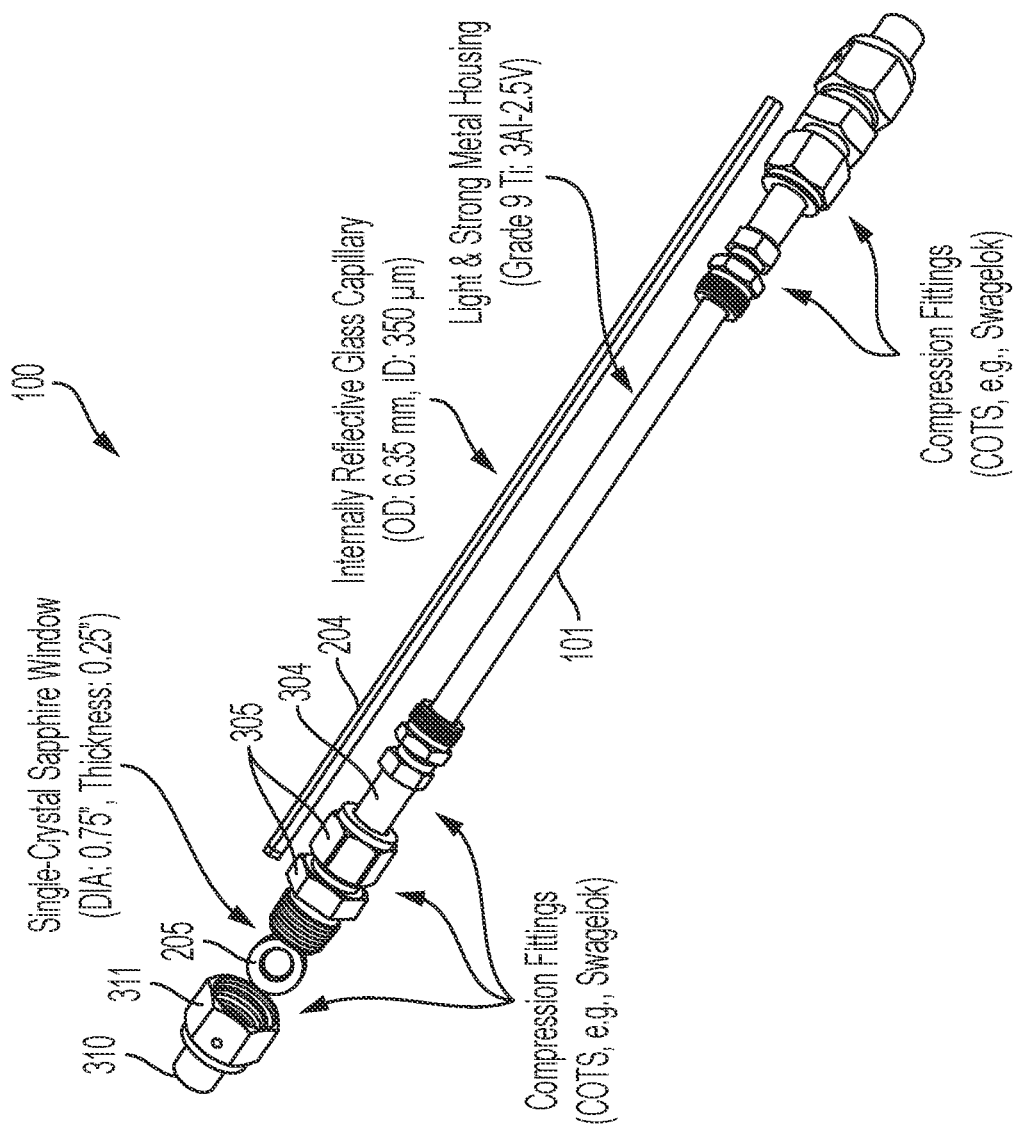
FIG. 12 is a perspective view of an exemplary flow cell, in accordance with embodiments disclosed herein.

Referring to FIG. 11, in a forward scattered and backward scattered Raman system 1100, a laser beam 1104 from a light source 1102 can pass through a first filter 1106A and into the first longitudinal end 105 of the flow cell 100. A portion of the beam 1104 can be back scattered, and can exit the first longitudinal end 105, reflect against the filter 1106A and into a signal combiner 1120. A remainder of the beam can exit the second end 106 of the flow cell 100, where a portion of said remainder of the beam is directed by a filter 1106B and into the signal combiner 1120, and another portion of the beam passes through the filter 1106B and into the beam dumb 814. The beam from the signal combiner 1120 can then pass into the spectrometer 812.

According to some embodiments, the flow cell can enable very fast fluid analyses with full-integration times for multi-component gaseous fluids in as little as 20 milliseconds.

According to some embodiments, the pressure housing of the flow cell can offer a simple design for cost-effective manufacturing and maintenance.

According to some embodiments, the flow cell can be compatible with polarized, non-polarized, and combinational light sources.

According to some embodiments, the flow cell can function with little or no modification as a long-path flow cell for spectroscopic liquid analyses with or without the capillary waveguide core.

According to some embodiments, the flow cell can comprise a low volume cavity that allows fast fluid exchange and turnover, thereby enabling observation of short-lived changes in fluid composition.

According to some embodiments, the flow cell can include O-ring compression seals around the capillary waveguide which yield near-perfect, auto-centering of the axial center of the waveguide to axial center of the flow cell pressure housing and corresponding fittings and optics windows.

According to some embodiments, the flow cell can use heavy-walled capillaries, which simplify application of the internally reflective coating due to their direct compatibility when connecting to appropriately sized compression fittings and can do so with few or no modifications, thereby adaptively accommodating various fluid-flow equipment for the introduction of reflective chemicals.

According to some embodiments, the flow cell can afford direct integration compatibility with optics systems for specialized or custom configurations such as exemplary optics cage systems, optics tube systems, optics bread-board systems, or optics rail systems.

It is contemplated that embodiments of the disclosed flow cell can be created using off-the-shelf components with little or no modification, thereby drastically reducing the cost in comparison to conventional flow cell systems.

Exemplary Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A flow cell for spectral analysis, the flow cell having a longitudinal dimension and comprising: an elongate housing defining an interior; a capillary waveguide extending along the longitudinal dimension through the interior of elongate housing, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at opposing ends; a first window at the first end of the capillary waveguide; and a second window at the second end of the capillary waveguide.

Aspect 2: The flow cell of aspect 1, wherein the inner diameter of the capillary wave guide is between approximately 0.1 and approximately 1 mm, and wherein the outer diameter of the capillary waveguide is at least 0.125 inches.

Aspect 3: The flow cell of aspect 1 or aspect 2, wherein each of the first and second windows each comprise single crystal sapphire.

Aspect 4: The flow cell of any one of the preceding aspects, further comprising reflective coating on the inner bore of the capillary waveguide.

Aspect 5: The flow cell of aspect 4, wherein the reflective coating comprises at least one material selected from the group consisting of: silver, gold, aluminum, and a dielectric material.

Aspect 6: The flow cell of any one of the preceding aspects, wherein the flow cell is configured to withstand an internal pressure of at least 10,000 psi.

Aspect 7: The flow cell of any one of the preceding aspects, further comprising an alignment fitting having a first end and an opposing second end and defining an interior bore proximate to the first end that is configured to receive an O-ring seal, wherein the interior bore at the first end defines a taper having a decreasing inner diameter in a direction away from the first end, wherein the alignment fitting is coupled to the elongate housing via a first compression seal at the second end of the alignment fitting.

Aspect 8: The flow cell of aspect 7, further comprising: a compression fitting that receives the second end of the alignment fitting, wherein the compression fitting is coupled to the alignment fitting via a second compression seal, wherein the first window is received within the compression fitting; a nut threadedly engaging the compression fitting, wherein threaded engagement of the nut with the compression fitting causes a biasing force against the first window; a first O-ring compressed between the compression fitting and the first window; a compression sleeve at least partially received within the interior bore of the alignment fitting so that the first window biases against the compression sleeve; and a second O-ring received within the interior bore of the alignment fitting and compressed between the compression sleeve and the alignment fitting.

Aspect 9: The flow cell of any one of the preceding aspects, further comprising: a plurality of elongate rods extending along the longitudinal dimension of the flow cell; and a plurality of plates defining holes therethrough that receive respective elongate rods of the plurality of elongate rods, wherein each of the plurality of plates receives therethrough and supports a portion of the flow cell.

Aspect 10: A spectroscopy system comprising: a flow cell having a longitudinal dimension, the flow cell comprising: an elongate housing defining an interior; a capillary waveguide extending along the longitudinal dimension through the interior of elongate housing, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at opposing ends; a first window at the first end of the capillary waveguide; and a second window at the second end of the capillary waveguide; a laser that is configured to provide a beam into the first end of the capillary waveguide; and a spectrometer that is configured to receive at least a portion of the beam from the second end of the capillary waveguide.

Aspect 11: The spectroscopy system of aspect 10, wherein the inner diameter of the capillary wave guide is between approximately 0.1 and approximately 1 mm, and wherein the outer diameter of the capillary waveguide is at least 0.125 inches.

Aspect 12: The spectroscopy system of aspect 10 or aspect 11, further comprising reflective coating on the inner bore of the capillary waveguide.

Aspect 13: The spectroscopy system of aspect 12, wherein the reflective coating comprises at least one material selected from the group consisting of: silver, gold, aluminum, and a dielectric material.

Aspect 14: The spectroscopy system of any one of aspects 10-13, further comprising an alignment fitting having a first end and an opposing second end and defining an interior bore proximate to the first end that is configured to receive an O-ring seal, wherein the interior bore at the first end defines a taper having a decreasing inner diameter in a direction away from the first end, wherein the alignment fitting is coupled to the elongate housing via a first compression seal at the second end of the alignment fitting Aspect 15: The spectroscopy system of aspect 14, further comprising: a compression fitting that receives the second end of the alignment fitting, wherein the compression fitting is coupled to the alignment fitting via a second compression seal, wherein the first window is received within the compression fitting; a nut threadedly engaging the compression fitting, wherein threaded engagement of the nut with the compression fitting causes a biasing force against the first window; a first O-ring compressed between the compression fitting and the first window; a compression sleeve at least partially received within the interior bore of the alignment fitting so that the first window biases against the compression sleeve; and a second O-ring received within the interior bore of the alignment fitting and compressed between the compression sleeve and the alignment fitting.

Aspect 16: A method comprising: providing a flow of gas through a spectrometer comprising: a flow cell having a longitudinal dimension, the flow cell comprising: an elongate housing defining an interior; a capillary waveguide extending along the longitudinal dimension through the interior of elongate housing, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at opposing ends; a first window at the first end of the capillary waveguide; and a second window at the second end of the capillary waveguide; a laser that is configured to provide a beam into the first end of the capillary waveguide; and a spectrometer that is configured to receive at least a portion of the beam from the second end of the capillary waveguide; providing the beam from the light source through the inner bore of the capillary waveguide; and receiving at least a portion of the beam from the laser at the spectrometer.

Aspect 17: The method of aspect 16, wherein the inner diameter of the capillary wave guide is between approximately 0.1 and approximately 1 mm, and the outer diameter of the capillary waveguide is at least 0.125 inches.

Aspect 18: The method of aspect 16 or aspect 17, wherein the flow cell further comprises a reflective coating on the inner bore of the capillary waveguide, wherein the reflective coating comprises at least one material selected from the group consisting of: silver, gold, aluminum, and a dielectric material.

Aspect 19: The method of any one of aspects 16-18, wherein the flow cell further comprises an alignment fitting having a first end and an opposing second end and defining an interior bore proximate to the first end that is configured to receive an O-ring seal, wherein the interior bore at the first end defines a taper having a decreasing inner diameter in a direction away from the first end, wherein the alignment fitting is coupled to the elongate housing via a first compression seal at the second end of the alignment fitting Aspect 20: The spectroscopy system of aspect 19, wherein the flow cell further comprises: a compression fitting that receives the second end of the alignment fitting, wherein the compression fitting is coupled to the alignment fitting via a second compression seal, wherein the first window is received within the compression fitting; a nut threadedly engaging the compression fitting, wherein threaded engagement of the nut with the compression fitting causes a biasing force against the first window; a first O-ring compressed between the compression fitting and the first window; a compression sleeve at least partially received within the interior bore of the alignment fitting so that the first window biases against the compression sleeve; and a second O-ring received within the interior bore of the alignment fitting and compressed between the compression sleeve and the alignment fitting.

Aspect 21: A flow cell for spectral analysis, the flow cell having a longitudinal dimension and comprising: an elongate housing defining an interior; a capillary waveguide extending along the longitudinal dimension through the interior of elongate housing, wherein the capillary waveguide has an outer surface defining an outer diameter, an inner bore defining an inner diameter, opposing first and second ends, and a length, wherein the capillary waveguide defines an inlet and an outlet to the inner bore, wherein the inner diameter of the capillary wave guide is between approximately 0.1 and approximately 1 mm, and wherein the outer diameter of the capillary waveguide is at least 0.125 inches.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A flow cell for spectral analysis, the flow cell having a longitudinal dimension and comprising:
   an enclosure tube defining an interior, wherein the enclosure tube has opposed ends;
   a capillary waveguide extending along the longitudinal dimension through the interior of the enclosure tube, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at the opposing first and second ends of the capillary waveguide; and
   first and second compression fitting assemblies, wherein the first compression fitting assembly is coupled to the first end of the enclosure tube, wherein the second compression fitting assembly is coupled to the second end of the enclosure tube, and wherein each of the first and second compression fitting assemblies comprises a respective window at the respective first or second end of the capillary waveguide
   wherein each of the first and second compression fitting assemblies comprises:
   an alignment fitting having a first end and an opposing second end and defining an interior bore proximate to the first end of the alignment fitting that is configured to receive an O-ring seal, wherein the interior bore at the first end of the alignment fitting defines a taper having a decreasing inner diameter in a direction away from the first end of the alignment fitting, and wherein the alignment fitting is coupled to the enclosure tube via a first compression seal at the second end of the alignment fitting;
   a compression fitting that receives the second end of the alignment fitting, wherein the compression fitting is coupled to the alignment fitting via a second compression seal, wherein the respective window is received within the compression fitting;
   a nut threadedly engaging the compression fitting, wherein threaded engagement of the nut with the compression fitting causes a biasing force against the respective window;
   a first O-ring compressed between the compression fitting and the respective window;
   a compression sleeve at least partially received within the interior bore of the alignment fitting so that the respective window biases against the compression sleeve; and
   a second O-ring received within the interior bore of the alignment fitting and compressed between the compression sleeve and the alignment fitting.

2. The flow cell of claim 1, wherein the inner diameter of the capillary wave guide is between approximately 0.1 and approximately 1 mm, and wherein the outer diameter of the capillary waveguide is at least 3.175 mm.

3. The flow cell of claim 1, wherein each of the respective windows comprise single crystal sapphire.

4. The flow cell of claim 1, further comprising reflective coating on the inner bore of the capillary waveguide.

5. The flow cell of claim 4, wherein the reflective coating comprises at least one material selected from the group consisting of: silver, gold, aluminum, and a dielectric material.

6. The flow cell of claim 1, wherein the capillary waveguide is configured to withstand an internal pressure of at least 10,000 psi.

7. The flow cell of claim 1, further comprising:
   a plurality of elongated rods extending along the longitudinal dimension of the flow cell; and
   a plurality of plates defining holes therethrough that receive respective elongated rods of the plurality of elongated rods, wherein each of the plurality of plates receives therethrough and supports a portion of the flow cell.

8. The flow cell of claim 1, wherein each of the first and second compression fitting assemblies comprises an O-ring that biases axially against the respective first or second end of the capillary waveguide.

9. A spectroscopy system comprising:
   a flow cell having a longitudinal dimension, the flow cell comprising:
   an enclosure tube defining an interior, wherein the enclosure tube has opposed ends;
   a capillary waveguide extending along the longitudinal dimension through the interior of the enclosure tube, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at the opposing first and second ends of the capillary waveguide; and first and second compression fitting assemblies, wherein the first compression fitting assembly is coupled to the first end of the enclosure tube, wherein the second compression fitting assembly is coupled to the second end of the enclosure tube, and wherein each of the first and second compression fitting assemblies comprises a respective window at the respective first or second end of the capillary waveguide;

a laser that is configured to provide a beam into the first end of the capillary waveguide; and a spectrometer that is configured to receive at least a portion of the beam from the second end of the capillary waveguide, wherein each respective compression fitting assembly of the first and second compression fitting assemblies comprises:

an alignment fitting having a first end and an opposing second end and defining an interior bore proximate to the first end of the alignment fitting that is configured to receive an O-ring seal, wherein the interior bore at the first end of the alignment fitting defines a taper having a decreasing inner diameter in a direction away from the first end of the alignment fitting, wherein the alignment fitting is coupled to the enclosure tube via a first compression seal at the second end of the alignment fitting;

a compression fitting that receives the second end of the alignment fitting, wherein the compression fitting is coupled to the alignment fitting via a second compression seal, wherein the respective window is received within the compression fitting;

a nut threadedly engaging the compression fitting, wherein threaded engagement of the nut with the compression fitting causes a biasing force against the respective window;

a first O-ring compressed between the compression fitting and the respective window;

a compression sleeve at least partially received within the interior bore of the alignment fitting so that the respective window biases against the compression sleeve; and a second O-ring received within the interior bore of the alignment fitting and compressed between the compression sleeve and the alignment fitting.

10. The spectroscopy system of claim 9, wherein the inner diameter of the capillary wave guide is between approximately 0.1 and approximately 1 mm, and wherein the outer diameter of the capillary waveguide is at least 3.175 mm.

11. The spectroscopy system of claim 9, further comprising reflective coating on the inner bore of the capillary waveguide.

12. A method comprising:
providing a flow of gas through a spectroscopy system comprising:
a flow cell having a longitudinal dimension, the flow cell comprising:
an enclosure tube defining an interior, wherein the enclosure tube has opposed ends;
a capillary waveguide extending along the longitudinal dimension through the interior of the enclosure tube, wherein the capillary waveguide has an outer surface defining an outer diameter, an inner bore defining an inner diameter, opposing first and second ends, and a length, wherein the capillary waveguide defines an inlet and an outlet to the inner bore, wherein the capillary waveguide has sufficient rigidity to remain optically straight when supported only by vertical forces at opposing ends; and first and second compression fitting assemblies, wherein the first compression fitting assembly is coupled to the first end of the enclosure tube, wherein the second compression fitting assembly is coupled to the second end of the enclosure tube, and wherein each of the first and second compression fitting assemblies comprises a respective window at the respective first or second end of the capillary waveguide;

a laser that is configured to provide a beam into the first end of the capillary waveguide; and a spectrometer that is configured to receive at least a portion of the beam from the second end of the capillary waveguide;

providing the beam from the light source through the inner bore of the capillary waveguide; and receiving at least a portion of the beam from the light source at the spectrometer, wherein each of the first and second compression fitting assemblies of the flow cell further comprises:

an alignment fitting having a first end and an opposing second end and defining an interior bore proximate to the first end of the alignment fitting that is configured to receive an O-ring seal, wherein the interior bore at the first end of the alignment fitting defines a taper having a decreasing inner diameter in a direction away from the first end of the alignment fitting, wherein the alignment fitting is coupled to the enclosure tube via a first compression seal at the second end of the alignment fitting;

a compression fitting that receives the second end of the alignment fitting, wherein the compression fitting is coupled to the alignment fitting via a second compression seal, wherein the respective window is received within the compression fitting;

a nut threadedly engaging the compression fitting, wherein threaded engagement of the nut with the compression fitting causes a biasing force against the respective window;

a first O-ring compressed between the compression fitting and the respective window;

a compression sleeve at least partially received within the interior bore of the alignment fitting so that the respective window biases against the compression sleeve; and a second O-ring received within the interior bore of the alignment fitting and compressed between the compression sleeve and the alignment fitting.

13. The method of claim 12, wherein the inner diameter of the capillary wave guide is between approximately 0.1 and approximately 1 mm, and the outer diameter of the capillary waveguide is at least 3.175 mm.

14. The method of claim 12, wherein the flow cell further comprises a reflective coating on the inner bore of the capillary waveguide, wherein the reflective coating comprises at least one material selected from the group consisting of: silver, gold, aluminum, and a dielectric material.

\* \* \* \* \*